(12) United States Patent
Tao

(10) Patent No.: US 9,101,013 B2
(45) Date of Patent: Aug. 4, 2015

(54) DRIVER FOR CONNECTING LED TO ELECTRONIC BALLAST

(71) Applicant: KONINKLIJKE PHILIPS N.V., Eindhoven (NL)

(72) Inventor: Haimin Tao, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/352,934

(22) PCT Filed: Oct. 17, 2012

(86) PCT No.: PCT/IB2012/055652
§ 371 (c)(1),
(2) Date: Apr. 18, 2014

(87) PCT Pub. No.: WO2013/057669
PCT Pub. Date: Apr. 25, 2013

(65) Prior Publication Data
US 2014/0265901 A1  Sep. 18, 2014

Related U.S. Application Data

(60) Provisional application No. 61/549,360, filed on Oct. 20, 2011.

(51) Int. Cl.
*H05B 37/00* (2006.01)
*H05B 33/08* (2006.01)

(52) U.S. Cl.
CPC .......... *H05B 33/0809* (2013.01); *Y02B 20/383* (2013.01); *Y02B 20/386* (2013.01)

(58) Field of Classification Search
CPC ..... H05B 37/02; H05B 33/08; H05B 33/0815
USPC .............. 315/200 R, 291, 294, 297, 307
See application file for complete search history.

(56) References Cited

U.S. PATENT DOCUMENTS

| 2002/0060526 | A1 | 5/2002 | Timmermans et al. |
| 2002/0067143 | A1* | 6/2002 | Robinett et al. ............. 315/291 |
| 2010/0033095 | A1 | 2/2010 | Sadwick |
| 2010/0096976 | A1 | 4/2010 | Park |
| 2010/0253302 | A1 | 10/2010 | Otte et al. |

(Continued)

FOREIGN PATENT DOCUMENTS

| WO | 2010027254 A1 | 3/2010 |
| WO | 2011021932 A1 | 2/2011 |

*Primary Examiner* — Jason M Crawford
(74) *Attorney, Agent, or Firm* — Yuliya Mathis

(57) ABSTRACT

To allow an electronic ballast (3) of a fluorescent tube lamp or a similar lamp to be replaced by a light emitting diode circuit (2) without removing the electronic ballast (3), a driver (1) is provided with a first circuit (10) for detuning a resonant tank of the electronic ballast (3). The first circuit (10) comprises a serial connection of a capacitor (11) and a bidirectional switch (12). The serial connection is coupled to the electronic ballast (3) for receiving an alternating current signal. The driver (1) is provided with a second circuit (20) for providing a direct current signal to the light emitting diode circuit (2). The second circuit (20) comprises a rectifier with inputs coupled to the serial connection and with outputs coupled to the light emitting diode circuit (2). Further, the driver (1) is provided with a third circuit (30) for providing a control signal to the first circuit (10) for controlling an amount of power supplied to the light emitting diode circuit (2).

14 Claims, 4 Drawing Sheets

(56) References Cited

U.S. PATENT DOCUMENTS

| | | |
|---|---|---|
| 2011/0095704 A1 | 4/2011 | Moussakov et al. |
| 2011/0248640 A1* | 10/2011 | Welten .......................... 315/210 |
| 2011/0266965 A1* | 11/2011 | Xu et al. .................... 315/200 R |
| 2011/0291585 A1* | 12/2011 | Foo ............................... 315/291 |
| 2011/0309759 A1* | 12/2011 | Shteynberg et al. .......... 315/201 |

* cited by examiner

DRIVER FOR CONNECTING LED TO ELECTRONIC BALLAST

FIELD OF THE INVENTION

The invention relates to a driver for driving a light emitting diode circuit. The invention further relates to a device.

Examples of such a device are lamps and parts thereof.

BACKGROUND OF THE INVENTION

US 2010 0033095 A1 discloses a solid state semiconductor light emitting diode replacement for fluorescent lamps. This replacement is relatively complex and relatively expensive owing to the fact that it is based on voltage conversion and power factor correction.

SUMMARY OF THE INVENTION

It is an object of the invention to provide an improved driver. It is a further object of the invention to provide an improved device.

According to a first aspect, a driver is provided for driving a light emitting diode circuit, the driver comprising
- a first circuit for detuning a resonant tank of an electronic ballast, the first circuit comprising a serial connection of a capacitor and a bidirectional switch, terminals of the serial connection being arranged to be coupled to terminals of the electronic ballast for receiving an alternating current signal from the electronic ballast,
- a second circuit for providing a direct current signal to the light emitting diode circuit, the second circuit comprising a rectifier with inputs coupled to the terminals of the serial connection and with outputs being arranged to be coupled to terminals of the light emitting diode circuit, and
- a third circuit for providing a control signal to the first circuit for controlling an amount of power supplied to the light emitting diode circuit.

The electronic ballast is also known as high frequency ballast or starter ballast for starting a fluorescent lamp or a similar lamp often in the form of a tube. Such lamps need to be replaced by light emitting diode circuits, owing to the fact that these circuits have a better optical efficiency that allows power consumption to be reduced.

Preferably, mainly the tube is to be replaced (direct replacement), and the electronic ballast remains in place. For this purpose, the driver is provided with a first circuit for detuning a resonant tank of the electronic ballast. The first circuit comprises a serial connection of a capacitor and a bidirectional switch. Terminals of the serial connection are arranged to be coupled to terminals of the electronic ballast for receiving an alternating current signal from the electronic ballast. Further, the driver is provided with a second circuit for providing a direct current signal to the light emitting diode circuit. The second circuit comprises a rectifier with inputs coupled to the terminals of the serial connection and with outputs arranged to be coupled to terminals of the light emitting diode circuit. Finally, the driver is provided with a third circuit for providing a control signal to the first circuit for controlling an amount of power supplied to the light emitting diode circuit.

As a result, a relatively simple and relatively low cost driver has been created, allowing the electronic ballast of a fluorescent tube lamp or a similar lamp to be replaced by a light emitting diode circuit without removing the electronic ballast.

A light emitting diode circuit comprises one or more light emitting diodes of whatever kind and in whatever combination. A bidirectional switch is a switch designed for an alternating current environment.

An embodiment of the driver is defined by the control signal having a fixed switching frequency and an adjustable duty cycle. The fixed switching frequency may be between 10 Hz and 100 kHz and will usually be chosen below the operating frequency of the electronic ballast, such as for example 40 kHz. During a non-conducting mode of the bidirectional switch that corresponds with an off time (Toff) of the duty cycle, more power (Poff) will be delivered to the light emitting diode circuit, and during a conducting mode of the bidirectional switch that corresponds with an on time (Ton=1−Toff) of the duty cycle, less power (Pon) will be delivered to the light emitting diode circuit. As a result, the average power delivered to the light emitting diode circuit will be Pav=Toff*Poff+Ton*Pon, wherein Toff+Ton=1.

An embodiment of the driver is defined by the bidirectional switch comprising a transistor with a control electrode for receiving the control signal and with first and second main electrodes, one side of the capacitor being coupled to one of the terminals of the serial connection, the first main electrode being coupled via a first diode to the other side of the capacitor and via a second diode to the other terminal of the serial connection, and the second main electrode being coupled via a third diode to the other side of the capacitor and via a fourth diode to the other terminal of the serial connection. These four diodes form a rectifier for rectifying an alternating current environment around the electronic ballast and the capacitor into a direct current environment for the transistor. The transistor can be any kind of transistor. Other kinds of bidirectional switches are not to be excluded.

An embodiment of the driver is defined by the third circuit being connected to a detector for detecting a parameter of the light emitting diode circuit, and the third circuit comprising a controller for, in response to a detection result, providing the control signal. Such a feedback loop provides more stability and compensation for component fluctuations.

An embodiment of the driver is defined by the parameter being a current flowing through at least one light emitting diode of the light emitting diode circuit, the controller comprising a comparator for comparing said current or a low pass filtered version thereof with a reference current, and the controller comprising a converter for converting a comparison result into the control signal. The comparator may be a subtracting circuit or a more complex circuit. Other kinds of parameters, such as voltages and light outputs, are not to be excluded.

An embodiment of the driver is defined by the converter comprising a proportional integral control unit, a modulator and an isolator for providing galvanic isolation, an output of the proportional integral control unit being coupled to an input of the modulator, an output of the modulator being coupled to a control electrode of a transistor of the isolator, one of the main electrodes of the transistor being coupled to a primary side of a transformer or an opto-coupler of the isolator, and a secondary side of the transformer or the opto-coupler being arranged to provide the control signal. The galvanic isolation provides matching between an alternating current side of the switch and a direct current side of the third circuit and thus provides a floating drive for the bidirectional switch. The proportional integral control unit provides duty cycle information, and the modulator provides control electrode information for the control electrode of the transistor. The transistor can be any kind of transistor.

An embodiment of the driver is defined by the detector comprising a resistor located between one of the outputs of the rectifier and one of the terminals of the light emitting diode circuit. Such a detector is relatively simple and relatively low cost. Other kinds of detectors are not to be excluded, for example to detect the other kinds of parameters.

An embodiment of the driver is defined in that it further comprises a fourth circuit for filtering the direct current signal, the fourth circuit comprising a further capacitor coupled to the outputs of the rectifier. Such a further capacitor is relatively simple and relatively low cost. The current used for feedback purposes may be a current flowing through at least one light emitting diode of the light emitting diode circuit or may be a current flowing through a parallel combination of the light emitting diode circuit and the further capacitor.

An embodiment of the driver is defined by the third circuit being further connected to a further detector for detecting a further parameter of the light emitting diode circuit, the controller being arranged for, in response to a further detection result, stopping a control. Such a further detector provides protection and reduced power consumption.

An embodiment of the driver is defined by the further parameter being a voltage present across the outputs of the rectifier, and the control being stopped in case the voltage is outside an expected range. Usually, the voltage present across the outputs of the rectifier should be within an expected range. To be able to check this, the further detector may comprise a further serial connection of two resistors connected to the outputs of the rectifier, wherein for example a voltage present across one of the resistors is to be compared with a reference voltage. Other kinds of further detectors are not to be excluded.

An embodiment of the driver is defined in that it further comprises a fifth circuit for providing a voltage supply for the controller. Such a voltage supply may be used to avoid the use of batteries.

An embodiment of the driver is defined by the fifth circuit comprising inputs coupled to the outputs of the rectifier and an output coupled to a voltage supply input of the controller.

An embodiment of the driver is defined by the driver being arranged for allowing the electronic ballast of a fluorescent tube lamp or a similar lamp to be replaced by the light emitting diode circuit without removing the electronic ballast.

According to a second aspect, a device is provided comprising the driver and further comprising the electronic ballast and/or the light emitting diode circuit.

An insight could be that an electronic ballast is to be detuned through a capacitor when it is used in combination with a light emitting diode circuit. A basic idea could be that in order to be able to control an output power to be delivered to the light emitting diode circuit, the capacitor is to be switched.

A further advantage could be that the driver is relatively simple and relatively low cost and therefore relatively robust, and that the driver allows an electronic ballast of a fluorescent tube lamp or a similar lamp to be replaced by a light emitting diode circuit without removing the electronic ballast, thereby reducing power consumption and minimizing replacement time.

These and other aspects of the invention will be apparent from and elucidated with reference to the embodiments described hereinafter.

DETAILED DESCRIPTION OF EMBODIMENTS

Figure 1:
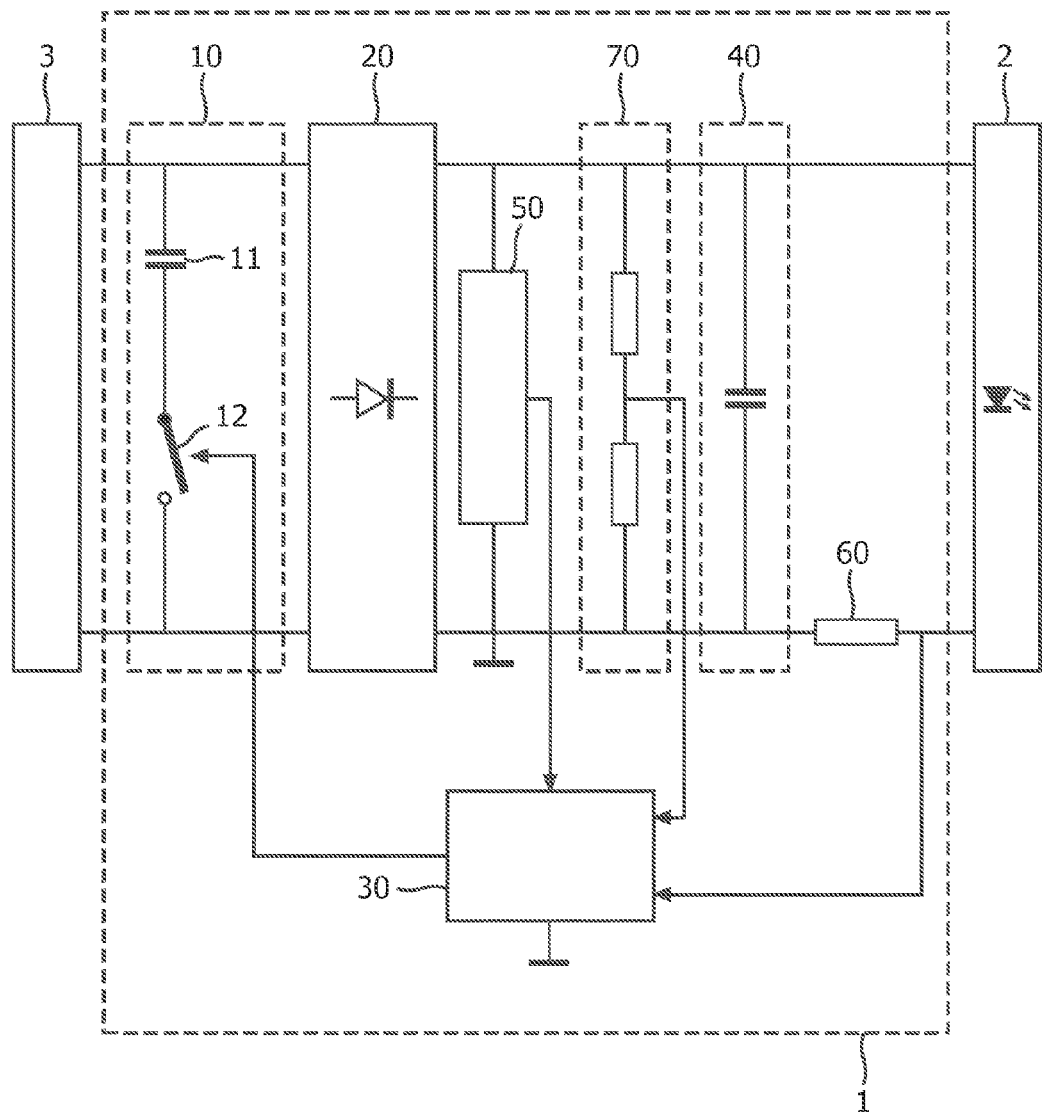
FIG. 1 shows an embodiment of a driver.

In FIG. 1, an embodiment of a driver 1 is shown. The driver 1 for driving a light emitting diode circuit 2 comprises a first circuit 10 for detuning a resonant tank of an electronic ballast 3. This first circuit 10 comprises a serial connection of a capacitor 11 and a bidirectional switch 12. Terminals of the serial connection are arranged to be coupled to terminals of the electronic ballast 3 for receiving an alternating current signal from the electronic ballast 3.

The driver 1 further comprises a second circuit 20 for providing a direct current signal to the light emitting diode circuit 2. This second circuit 20 comprises a rectifier with inputs coupled to the terminals of the serial connection and with outputs being arranged to be coupled to terminals of the light emitting diode circuit 2. The rectifier for example comprises one diode or two diodes or four diodes in a bridge construction.

The driver 1 further comprises a third circuit 30 for providing a control signal to the first circuit 10 for controlling an amount of power supplied to the light emitting diode circuit 2.

Preferably, the driver 1 further comprises a fourth circuit 40 for filtering the direct current signal, the fourth circuit 40 comprising a further capacitor coupled to the outputs of the rectifier.

Preferably, the driver 1 further comprises a fifth circuit 50 for providing a voltage supply for the third circuit 30, the fifth circuit 50 comprising inputs coupled to the outputs of the rectifier and an output coupled to a voltage supply input of the third circuit 30.

Preferably, the driver 1 further comprises a detector 60 to be discussed with reference to FIG. 3 and a further detector 70 to be discussed after the description of FIG. 3.

Figure 2:
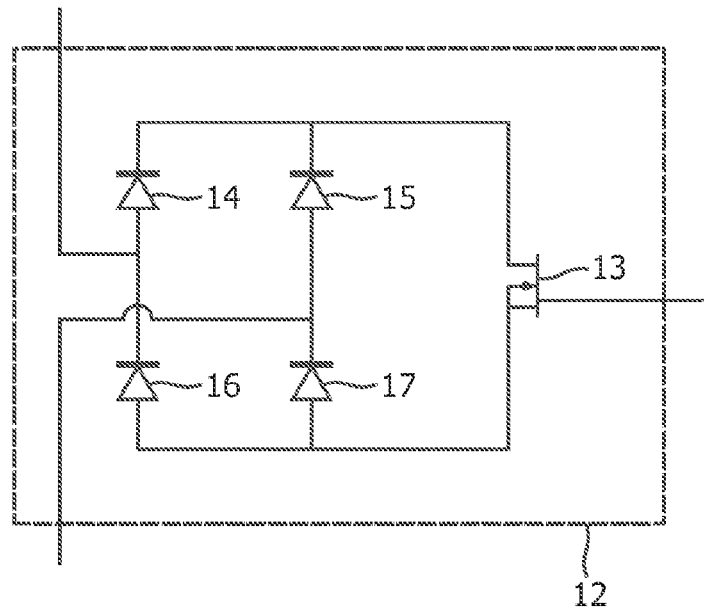
FIG. 2 shows an embodiment of a bidirectional switch.

In FIG. 2, an embodiment of a bidirectional switch 12 is shown. Possibly, the bidirectional switch 12 comprises a transistor 13 with a control electrode for receiving the control signal and with first and second main electrodes. One side of the capacitor 11 is coupled to one of the terminals of the serial connection. The first main electrode is coupled via a first diode 14 to the other side of the capacitor 11 and via a second diode 15 to the other terminal of the serial connection. The second main electrode is coupled via a third diode 16 to the other side of the capacitor 11 and via a fourth diode 17 to the other terminal of the serial connection.

Preferably, the control signal as produced by the third circuit 30 may have a fixed switching frequency and an adjustable duty cycle.

Figure 3:
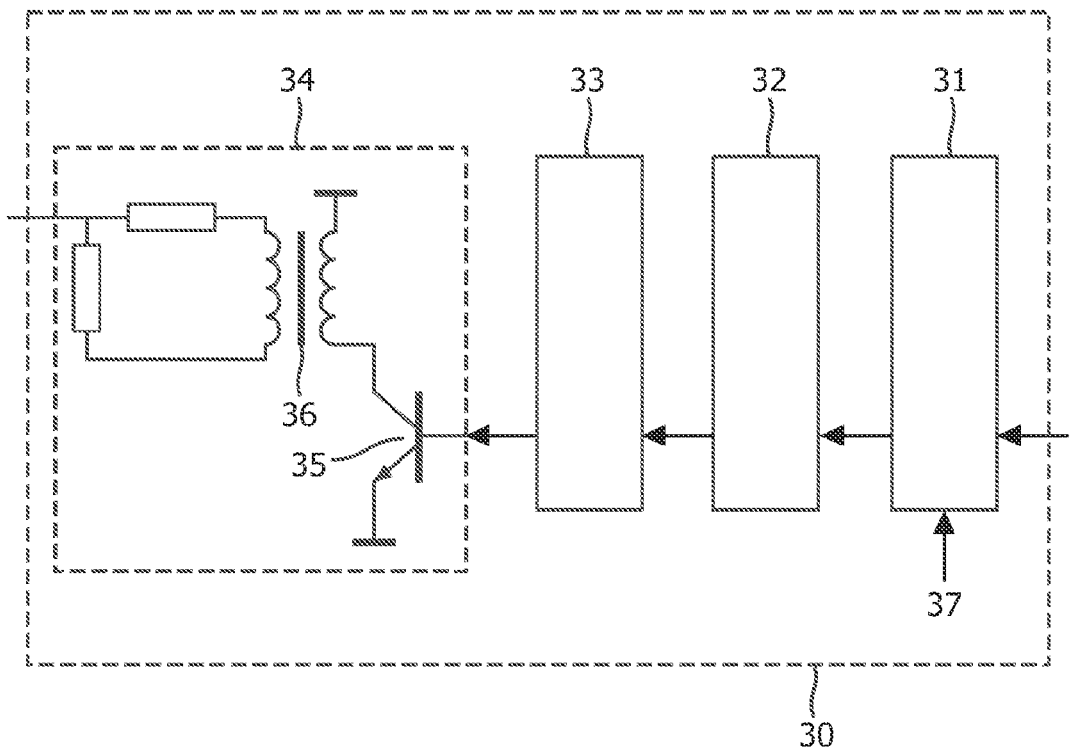
FIG. 3 shows an embodiment of a third circuit.

In FIG. 3, an embodiment of the third circuit 30 is shown. Possibly, the third circuit 30 is connected to the detector 60 for detecting a parameter of the light emitting diode circuit 2. The third circuit 30 may comprise a controller 31, 32, 33, 34 for, in response to a detection result, providing the control signal.

Preferably, this parameter is a current flowing through at least one light emitting diode of the light emitting diode circuit 2. The controller 31, 32, 33, 34 may comprise a comparator 31 for comparing said current or a low pass filtered version thereof with a reference current, here indicated by reference numeral 37. The controller 31, 32, 33, 34 may further comprise a converter 32, 33, 34 for converting a comparison result into the control signal.

Preferably, the converter 32, 33, 34 comprises a proportional integral control unit 32, a modulator 33 and an isolator 34 for providing galvanic isolation. An output of the proportional integral control unit 32 is coupled to an input of the modulator 33. An output of the modulator 33 is coupled to a control electrode of a transistor 35 of the isolator 34. One of the main electrodes of the transistor 35 is coupled to a primary side (primary winding) of a transformer 36 of the isolator 34, and a secondary side (secondary winding) of the transformer 36 is arranged to provide the control signal, for example via a resistor bridge. Instead of a transformer, an opto-coupler could be used. When an opto-coupler is used, the energy necessary for driving the bidirectional switch needs to be additionally provided. A transformer does not need such an additional provision of energy owing to the fact that it can transfer energy from its primary side to its secondary side.

Possibly, the detector 60 comprises a resistor located between one of the outputs of the rectifier and one of the terminals of the light emitting diode circuit 2.

Possibly, the third circuit 30 is further connected to the further detector 70 for detecting a further parameter of the light emitting diode circuit 2. The controller 31, 32, 33, 34 is arranged for, in response to a further detection result, stopping a control. Preferably, the further parameter is a voltage present across the outputs of the rectifier, and the control is stopped in case the voltage is outside an expected range.

Figure 4:
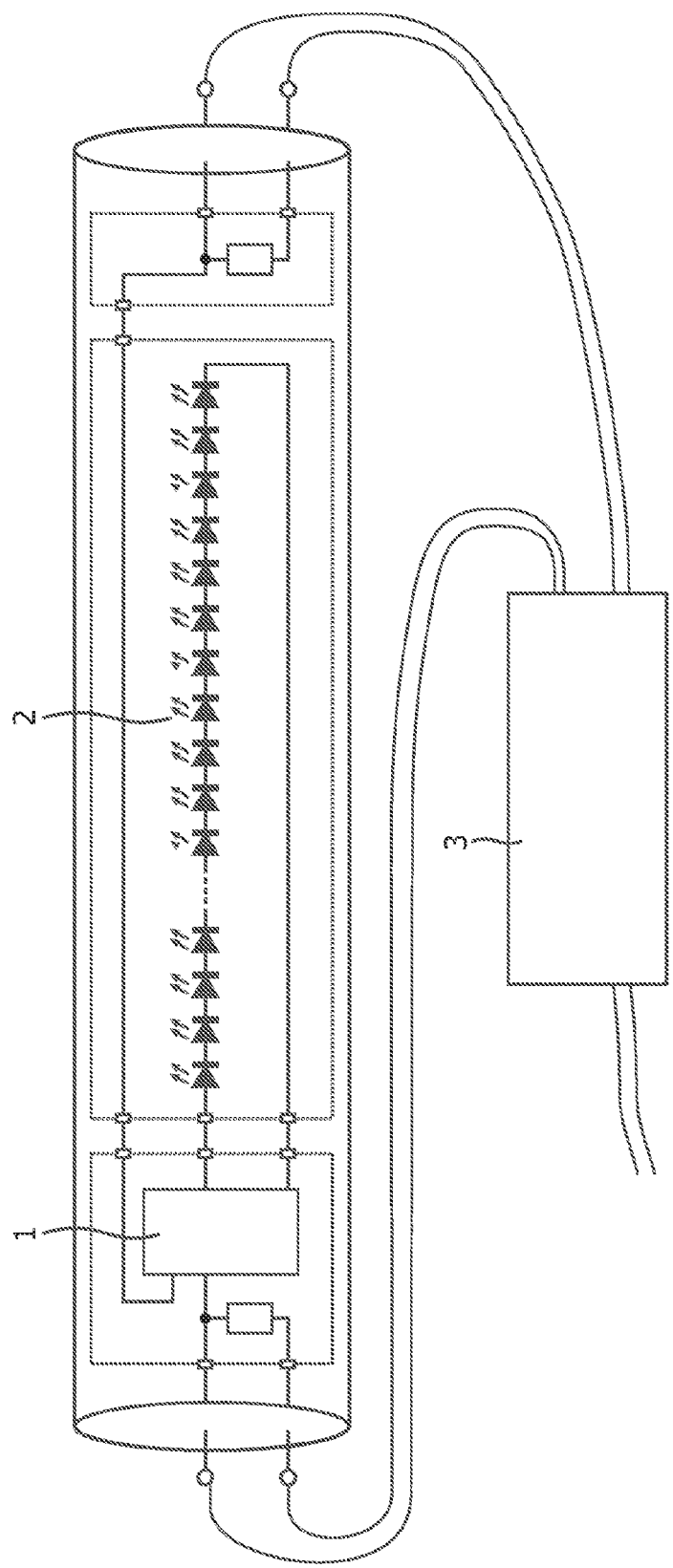
FIG. 4 shows a tube with a light emitting diode circuit.

In FIG. 4, a tube is shown comprising a light emitting diode circuit 2 and a driver 1 and said tube being coupled to an electronic ballast 3. The driver 1 allows the electronic ballast 3 of a fluorescent tube lamp or a similar lamp to be replaced by the light emitting diode circuit 2 without removing the electronic ballast 3.

Figure 5:
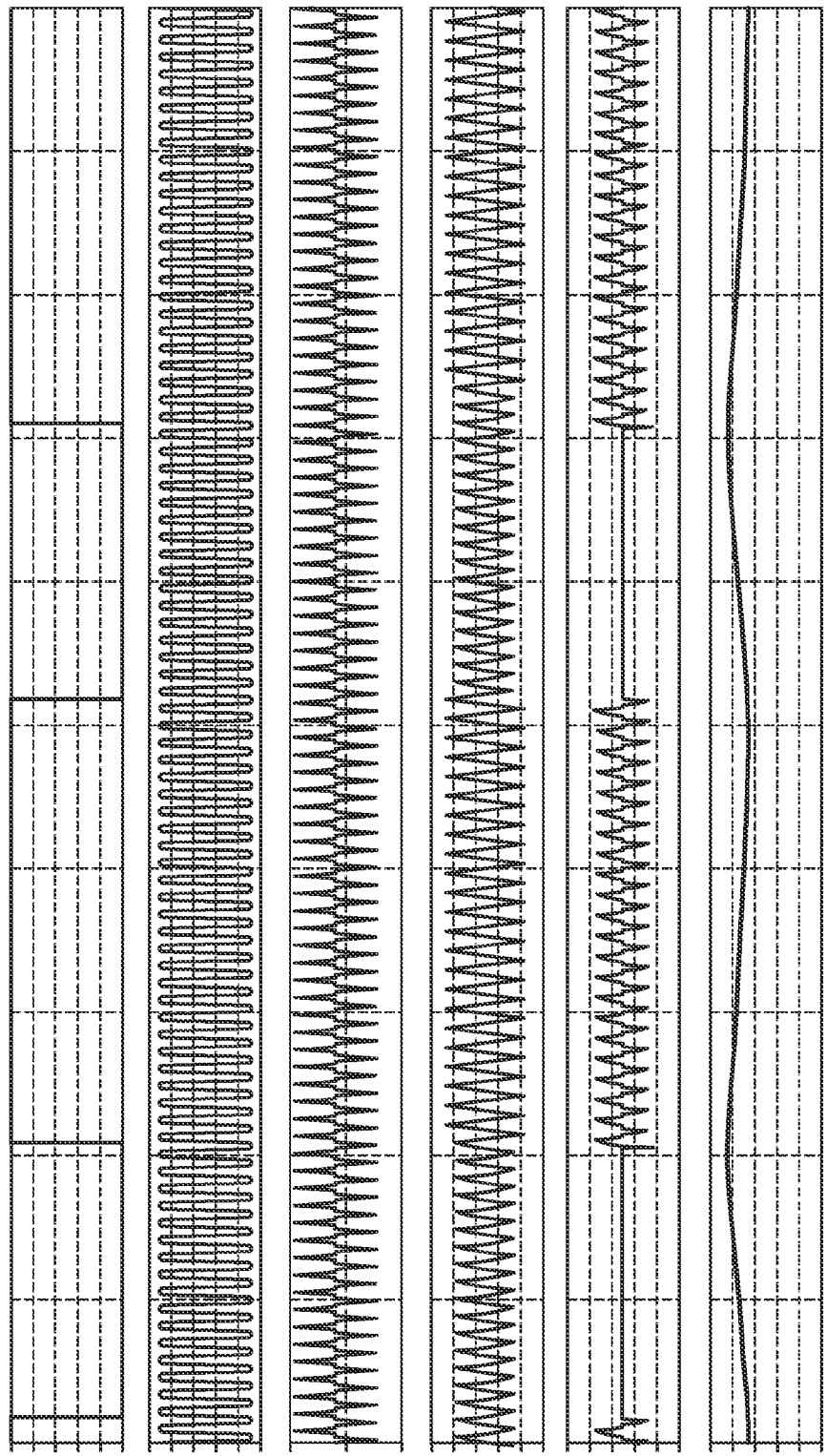
FIG. 5 shows simulated waveforms.

In FIG. 5, simulated waveforms are shown including, from top to bottom, the control signal, a driver input voltage, a driver input current, a current flowing through (the resonant tank of) the electronic ballast 3, a current flowing through the capacitor 11, and a current flowing through the light emitting diode circuit 2.

Summarizing, to allow an electronic ballast 3 of a fluorescent tube lamp or a similar lamp to be replaced by a light emitting diode circuit 2 without removing the electronic ballast 3, a driver 1 is provided with a first circuit 10 for detuning a resonant tank of the electronic ballast 3. The first circuit 10 comprises a serial connection of a capacitor 11 and a bidirectional switch 12. The serial connection is coupled to the electronic ballast 3 for receiving an alternating current signal. The driver 1 is provided with a second circuit 20 for providing a direct current signal to the light emitting diode circuit 2. The second circuit 20 comprises a rectifier with inputs coupled to the serial connection and with outputs coupled to the light emitting diode circuit 2. Further, the driver 1 is provided with a third circuit 30 for providing a control signal to the first circuit 10 for controlling an amount of power supplied to the light emitting diode circuit 2.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A driver for driving a light emitting diode circuit the driver comprising
 a first circuit for detuning a resonant tank of an electronic ballast, the first circuit comprising a serial connection of a capacitor and a bidirectional switch, terminals of the serial connection being arranged to be coupled to terminals of the electronic ballast for receiving an alternating current signal from the electronic ballast,
 a second circuit for providing a direct current signal to the light emitting diode circuit, the second circuit comprising a rectifier with inputs coupled to the terminals of the serial connection and with outputs being arranged to be coupled to terminals of the light emitting diode circuit, and
 a third circuit for providing a control signal to the first circuit for controlling an amount of power supplied to the light emitting diode circuit.

2. The driver as defined in claim 1, the control signal having a fixed switching frequency and an adjustable duty cycle.

3. The driver as defined in claim 2, the bidirectional switch comprising a transistor with a control electrode for receiving the control signal and with first and second main electrodes, one side of the capacitor being coupled to one of the terminals of the serial connection, the first main electrode being coupled via a first diode to the other side of the capacitor and via a second diode to the other terminal of the serial connection, and the second main electrode being coupled via a third diode to the other side of the capacitor and via a fourth diode to the other terminal of the serial connection.

4. The driver as defined in claim 1, the third circuit being connected to a detector for detecting a parameter of the light emitting diode circuit, and the third circuit comprising a controller for, in response to a detection result, providing the control signal.

5. The driver as defined in claim 4, the parameter being a current flowing through at least one light emitting diode of the light emitting diode circuit, the controller comprising a comparator for comparing said current or a low pass filtered version thereof with a reference current, and the controller comprising a converter for converting a comparison result into the control signal.

6. The driver as defined in claim 5, the converter comprising a proportional integral control unit, a modulator and an isolator for providing galvanic isolation, an output of the proportional integral control unit being coupled to an input of the modulator, an output of the modulator being coupled to a control electrode of a transistor of the isolator, one of the main electrodes of the transistor being coupled to a primary side of a transformer or an opto-coupler of the isolator, and a secondary side of the transformer or the opto-coupler being arranged to provide the control signal.

7. The driver as defined in claim 5, with a detector comprising a resistor located between one of the outputs of the rectifier and one of the terminals of the light emitting diode circuit.

8. The driver as defined in claim 1, further comprising
 a fourth circuit for filtering the direct current signal, the fourth circuit comprising a further capacitor coupled to the outputs of the rectifier.

9. The driver as defined in claim 1, the third circuit being further connected to a further detector for detecting a further parameter of the light emitting diode circuit the controller being arranged for, in response to a further detection result, stopping a control.

10. The driver as defined in claim 9, the further parameter being a voltage present across the outputs of the rectifier, and the control being stopped in case the voltage is outside an expected range.

11. The driver as defined in claim 1, further comprising
a fifth circuit for providing a voltage supply for the controller.

12. The driver as defined in claim 11, the fifth circuit comprising inputs coupled to the outputs of the rectifier and an output coupled to a voltage supply input of the controller.

13. The driver as defined in claim 1 for allowing the electronic ballast of a fluorescent tube lamp or a similar lamp to be replaced by the light emitting diode circuit without removing the electronic ballast.

14. A device comprising the driver as defined in claim 1 and further comprising the electronic ballast and/or the light emitting diode circuit.

* * * * *